No. 750,381. PATENTED JAN. 26, 1904.
R. LOVE.
FERTILIZER DISTRIBUTER.
APPLICATION FILED SEPT. 9, 1901.
NO MODEL. 3 SHEETS—SHEET 1.

WITNESSES: INVENTOR
Chas. J. Foner. Robert Love.
Wm. T. Brewer. BY Hoyt Parsons.
ATTORNEYS No. 750,381. PATENTED JAN. 26, 1904.
R. LOVE.
FERTILIZER DISTRIBUTER.
APPLICATION FILED SEPT. 9, 1901.
NO MODEL. 3 SHEETS—SHEET 2.

WITNESSES:
Chas. J. Foner.
Wm. T. Brewer.

INVENTOR
Robert Love.
BY
Hoyt & Parsons.
ATTORNEYS

No. 750,381. PATENTED JAN. 26, 1904.
R. LOVE.
FERTILIZER DISTRIBUTER.
APPLICATION FILED SEPT. 9, 1901.
NO MODEL. 3 SHEETS—SHEET 3.
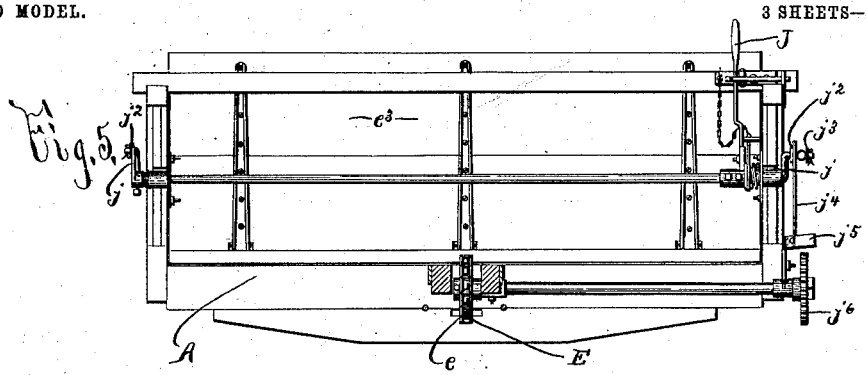
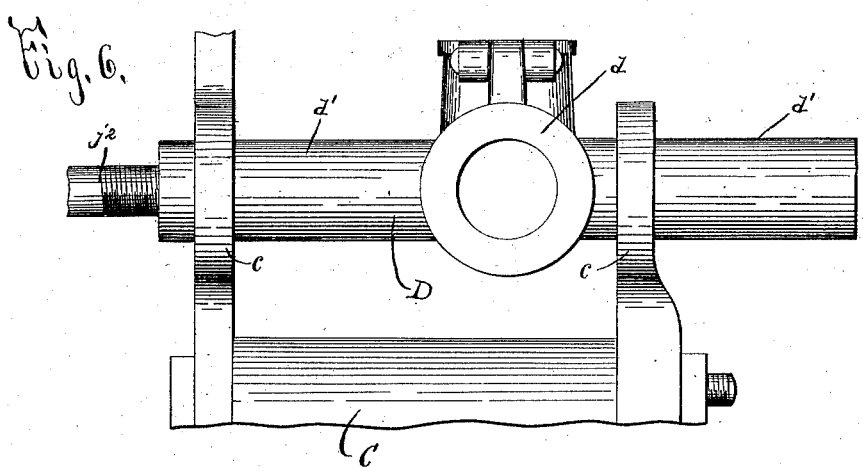
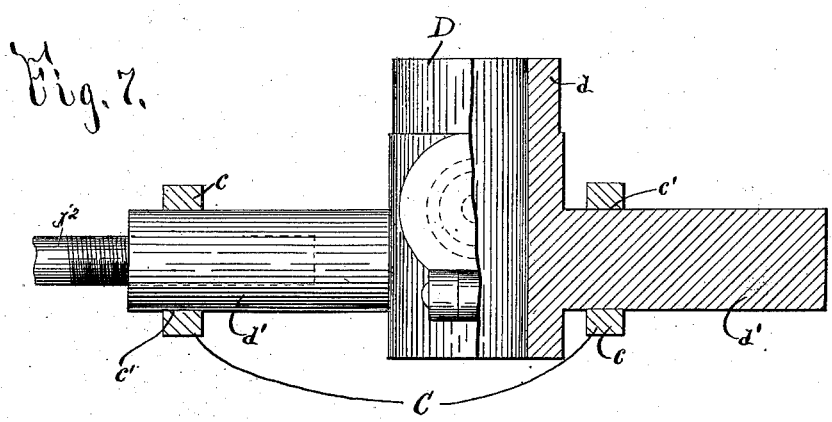
WITNESSES:
Chas. J. Foner.
Wm. T. Brewer.
INVENTOR
Robert Love.
BY
Heyn Parsons.
ATTORNEYS No. 750,381. Patented January 26, 1904.

UNITED STATES PATENT OFFICE.

ROBERT LOVE, OF SYRACUSE, NEW YORK, ASSIGNOR TO KEMP & BURPEE MANUFACTURING COMPANY, OF SYRACUSE, NEW YORK, A CORPORATION OF NEW YORK.

FERTILIZER-DISTRIBUTER.

SPECIFICATION forming part of Letters Patent No. 750,381, dated January 26, 1904.

Application filed September 9, 1901. Serial No. 74,720. (No model.)

*To all whom it may concern:*

Be it known that I, ROBERT LOVE, of Syracuse, in the county of Onondaga and State of New York, have invented a certain new and useful Fertilizer-Distributer, of which the following is a specification.

My invention relates to fertilizer-distributers, and has for its object the production of means for preventing breakage and injury of the discharging and feeding devices for the fertilizer and the power-transmitting mechanisms which actuate said discharging and feeding devices; and it consists in the combinations and constructions hereinafter described and claimed.

Figure 1:
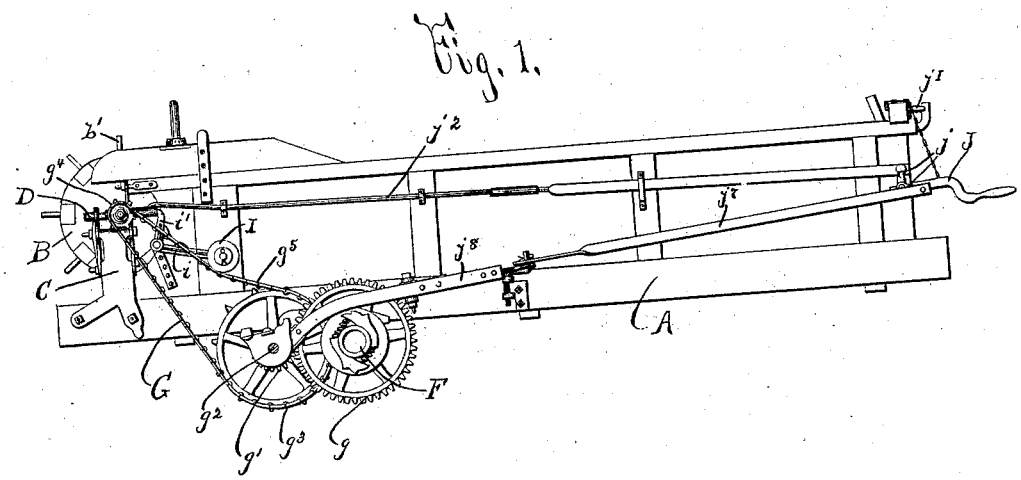
Figure 2:
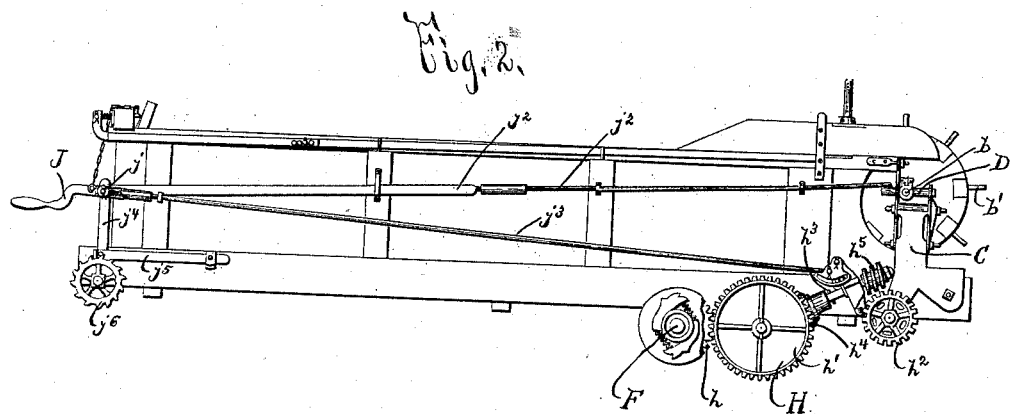
Figure 3:
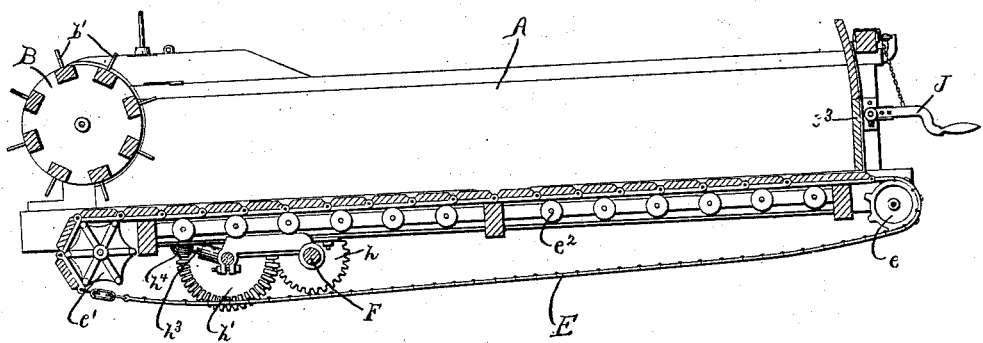
Figure 4:
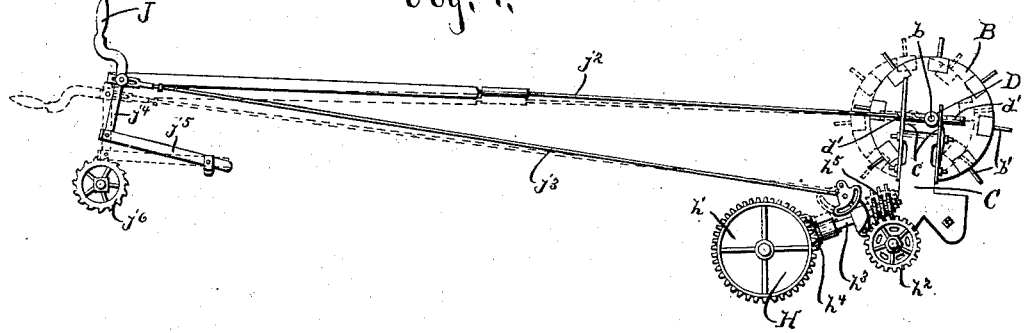

Figures 1 and 2 are opposite side elevations of a portion of a fertilizer-distributer embodying my invention, the movable parts being shown in the positions assumed when the fertilizer is not being discharged. Fig. 3 is a longitudinal vertical section of the parts seen in Figs. 1 and 2. Fig. 4 is an elevation of the detached discharging device, a portion of the power-transmitting mechanism for operating the feeding device, the actuating member, and the connections between said discharging device, power-transmitting mechanism, and actuating member. Fig. 5 is a front elevation of the parts shown in Figs. 1, 2, and 3. Fig. 6 is an elevation of one of the detached movable supporting members for the discharging device and the upper end of the corresponding fixed supporting member. Fig. 7 is a top plan view, partly in section, of the parts seen in Fig. 6.

The illustrated embodiment of my fertilizer-distributer comprises a receptacle A for the fertilizer, a device B for discharging the fertilizer, supporting members C D for the device B, a device E for feeding the fertilizer to the device B, a driving-shaft F, power-transmitting mechanisms G H, connected, respectively, to said discharging and feeding devices and to the driving-shaft, means I for preventing undue slack in a sprocket-chain which is connected to the device B and forms part of the mechanism G, and an actuating member J for moving the discharging device B backwardly from the contiguous portion of the fertilizer for controlling the transmission of power by the mechanisms G H and for actuating the means I.

The receptacle A is of any suitable form, size, and construction, is mounted on any desirable supporting-wheels, (not illustrated,) and is shown as having its rear end and its bottom open.

In the preferable construction of my invention the discharging device B is arranged to form a closure for the open rear end of the receptacle A and consists of a revoluble frame provided with trunnions $b$ at its opposite ends and with projecting teeth $b'$ on its periphery. Said device B is movable for discharging the fertilizer, is at rest when not discharging the fertilizer, and is movable backwardly from the contiguous portion of the fertilizer just before or as the device B commences its operation.

The supporting members C are suitably fixed to opposite sides of the receptacle A, being thus arranged side, by side and are provided with separated arms $c$, which are arranged one in advance of the other and are formed with guides $c'$, extending substantially parallel with the line of draft. The supporting members D are provided with bearings $d$ for the trunnions $b$ and with oppositely-extending arms $d'$, reciprocally movable rectilinearly to and fro in the guides $c'$ of the members C.

The feeding device E forms a closure for the open bottom of the receptacle A and is of any desirable form, size, and construction, being here shown as an endless belt running over an idler $e$, a driving-wheel $e'$, and rollers $e^2$ and as provided with an upright end board $e^3$.

The driving-shaft F is supported in any suitable manner by the receptacle A or the sills thereof or the running-gear of the fertilizer-distributer and is actuated by one or more of the supporting-wheels (not illustrated) for the distributer, being here shown as provided with clutch-dogs which are engaged with said wheels when moving forwardly.

As best seen in Fig. 1, the power-transmitting mechanism G consists of a gear $g$, fixed to the driving-shaft F, a second gear $g'$, movable lengthwise of a stationary shaft $g^2$ and meshing with the gear $g$, a sprocket-wheel $g^3$, mounted on the shaft $g^2$, a clutch (not illustrated) for connecting the gear $g'$ and the sprocket-wheel $g^3$ when the gear $g'$ is moved endwise toward the sprocket-wheel $g^3$, a sprocket-wheel $g^4$, fixed to the discharging device B, and a chain $g^5$, connecting the wheels $g^3$ $g^4$.

The power-transmitting mechanism H (best shown in Figs. 2 and 4) consists of a gear $h$, fixed to the driving-shaft F, a disk-gear $h'$, meshing with the gear $h$ and mounted on a spindle fixed to the receptacle A or the sills thereof, a worm-wheel $h^2$, fixed to the shaft for the driving-wheel $e'$, and a movable shaft $h^3$, having one end pivoted to the shaft for the disk-gear $h'$ and provided with a bevel-pinion $h^4$, meshing with said gear $h'$, and its opposite end provided with a worm $h^5$, movable vertically into and out of engagement with the worm-wheel $h^2$.

The means I for preventing undue slack in the sprocket-chain $g^5$, connected to the device B and forming part of the mechanism G, usually consists of a roller bearing against the outer face of the upper portion of the chain $g^5$ and journaled on a forwardly-extending arm or end of a movable support or lever $i$, pivoted to the receptacle A and having an upwardly-extending arm or end $i'$ engaged with the front face of one of the supporting members D, as illustrated in Fig. 1.

The actuating member J generally consists of a rock-lever, here shown as fixed to a rock-shaft journaled in the front end of the receptacle A and provided at its ends with crank-arms $j$, which form, essentially, parts of the member J. Said actuating member is normally arranged in a substantially horizontal plane and is locked in an upright position by a suitable catch $j'$. The two arms $j$ are secured to the members D by connecting members $j^2$, arranged at opposite sides of the receptacle A, and one of said two arms is connected by a link $j^3$ to the shaft $h^3$ for raising and lowering its end provided with the worm $h^5$, and is connected by a link $j^4$ to a stop-lever $j^5$ for normally engaging a toothed wheel $j^6$, fixed to the shaft for the idler $e$. The connection between said one of the arms $j$ and the link $j^3$ permits a limited movement of said arm before the same commences to actuate the link $j^3$, and is here illustrated as consisting of a pin provided on said one of the arms $j$ and movable in a slot in the link $j^3$ against the action of a spring within said slot. One of the arms $j$ of the actuating member J is connected by a link $j^7$ to a lever $j^8$ for reciprocating the gear $g'$.

In the use of a fertilizer-distributer embodying my invention the fertilizer is loaded within the receptacle A while the actuating member J remains in its horizontal position, the distributer is drawn to the place for the discharge of the fertilizer, and the operator, without leaving his seat, raises the free end of the actuating member J and engages the same with the catch $j'$. As said member J is rocked upwardly the discharging device is moved backwardly from the contiguous portion of the fertilizer by the connecting members of parts $j^2$ and the reciprocating members D, the upper portion of the sprocket-chain $g^5$ is straightened more or less, thus elevating the means I, which is free to rise as the corresponding member D moves backwardly, thereby avoiding undue tightness of the sprocket-chain $g^5$, the stop-lever $j^5$ is withdrawn from engagement with the wheel $j^6$, the mechanism G is caused to transmit rotary motion to the discharging device, and the mechanism H is operated to actuate the feeding device to supply the fertilizer to the device B. When the entire load of fertilizer or any predetermined part thereof is discharged, the member J may be returned to its normal depressed position, whereupon the discharging device will be moved toward the front of the receptacle, the supporting member D, engaged with the support $i$, will depress the means I and the contiguous portion of the sprocket-chain $g^5$ for preventing undue slack in the sprocket-chain $g^5$, the stop-lever $j^5$ will be engaged with the wheel $j^6$, and the transmission of motion to the discharging and feeding devices will be prevented. The supporting members D are firmly and positively guided and supported in their movement and form a particularly simple and practical means for supporting and moving the device B, and the means I and the support $i$, coöperating with the sprocket-chain $g^5$ and actuated by one of the supporting members D, prevent jumping or undue forward movement or jarring of the chain $g^5$, especially when the fertilizer-distributer is passing over uneven ground, and add greatly to the practicability and efficiency of my invention.

My fertilizer-distributer will now be readily understood upon reference to the foregoing description and the accompanying drawings, and it will be particularly noted that I do not limit myself herein to the construction and arrangement of the discharging and feeding devices or the power-transmitting mechanism for actuating these devices, since said parts may be more or less varied without departing from the spirit of my invention.

Having thus fully described my invention, what I claim as new, and desire to secure by Letters Patent, is—

1. In a fertilizer-distributer, the combination of a receptacle for the fertilizer, a discharging device, said device being movable for discharging the fertilizer and being at rest when not discharging the fertilizer, and a supporting member for the discharging device, said supporting member being movable rectilinearly for moving the discharging device from the contiguous portion of the fertilizer substantially as and for the purpose described.

2. In a fertilizer-distributer, the combination of a receptacle for the fertilizer, a discharging device, said device being movable for discharging the fertilizer and being at rest when not discharging the fertilizer, a supporting member for the discharging device, said supporting member being reciprocally movable in a retilinear plane and an actuating member for moving the discharging device from the contiguous portion of the fertilizer, substantially as and for the purpose specified.

3. In a fertilizer-distributer, the combination of a receptacle for the fertilizer, said receptacle being provided with a guide, a discharging device, said device being movable for discharging the fertilizer and being at rest when not discharging the fertilizer, and a supporting member for the discharging device, said supporting member being movable in the guide for moving the discharging device from the contiguous portion of the fertilizer, substantially as and for the purpose set forth.

4. In a fertilizer-distributer, the combination of a receptacle for the fertilizer, said receptacle being provided with separated guides arranged one in advance of the other, a discharging device, said device being movable for discharging the fertilizer and being at rest when not discharging the fertilizer, and a supporting member for the discharging device provided with oppositely-extending arms movable in the guides for moving the discharging device from the contiguous portion of the fertilizer, substantially as and for the purpose described.

5. In a fertilizer-distributer, the combination of a receptacle for the fertilizer, said receptacle being provided with a guide, a discharging device, said device being movable for discharging the fertilizer and being at rest when not discharging the fertilizer, a supporting member for the discharging device, said supporting member being movable in the guide for moving the discharging device from the contiguous portion of the fertilizer, and an actuating member connected to the supporting member for moving the same in the guide, substantially as and for the purpose specified.

6. In a fertilizer-distributer, the combination of a receptacle for the fertilizer, said receptacle being provided with guides arranged at opposite sides thereof, a rotary discharging device having its opposite ends provided with trunnions, and supporting members for the trunnions, said supporting, members being freely movable to and fro in the guides, substantially as and for the purpose set forth.

7. In a fertilizer-distributer, the combination of a receptacle for the fertilizer, said receptacle being provided with guides arranged at opposite sides thereof, a rotary discharging device having its opposite ends provided with trunnions, supporting members for the trunnions, said supporting members being movable to and fro in the guides, an actuating member, and connecting members at opposite sides of the receptacle for connecting the supporting members to the actuating member, substantially as and for the purpose described.

8. In a fertilizer-distributer, the combination of a receptacle for the fertilizer, a discharging device, said device being movable for discharging the fertilizer and being at rest when not discharging the fertilizer, a supporting member fixed to the receptacle and provided with a guide, and a second supporting member connected to the discharging device and movable in the guide for moving the discharging device from the contiguous portion of the fertilizer, substantially as and for the purpose specified.

9. In a fertilizer-distributer, the combination of a receptacle for the fertilizer, a discharging device, said device being movable for discharging the fertilizer and being at rest when not discharging the fertilizer, a fixed supporting member provided with separated arms having guides, and a second supporting member connected to the discharging device and provided with arms freely movable in the guides, substantially as and for the purpose set forth.

10. In a fertilizer-distributer, the combination of a receptacle for the fertilizer, a rotary discharging device having its opposite ends provided with trunnions, said device being movable for discharging the fertilizer and being at rest when not discharging the fertilizer, fixed supporting members disposed at opposite sides of the receptacle and each provided with guides arranged substantially parallel with the line of draft, and additional supporting members provided with bearings for the trunnions and oppositely-extending arms movable in the guides of the former supporting members, substantially as and for the purpose described.

11. In a fertilizer-distributer, the combination of a receptacle for the fertilizer, a rotary discharging device having its opposite ends provided with trunnions, said device being movable for discharging the fertilizer and being at rest when not discharging the fertilizer, fixed supporting members at opposite sides of the receptacle provided with guides arranged substantially parallel with the line of draft, additional supporting members provided with bearings for the trunnions and oppositely-extending arms movable in the guides of the former supporting members, an actuating member, and connecting parts at opposite sides of the receptacle for connecting the additional supporting members to the actuating member, substantially as and for the purpose specified.

12. In a fertilizer-distributer, the combination of a receptacle for the fertilizer, a discharging device, said device being movable for discharging the fertilizer and being at rest when not discharging the fertilizer, a movable supporting member for the discharging device, power-transmitting mechanism for actuating the discharging device, said mechanism being provided with a sprocket-chain, and means movable with the supporting member for preventing undue slack in said sprocket-chain, substantially as and for the purpose set forth.

13. In a fertilizer-distributer, the combination of a receptacle for the fertilizer, a discharging device, said device being movable for discharging the fertilizer and being at rest when not discharging the fertilizer, a movable supporting member for the discharging device, power-transmitting mechanism for actuating the discharging device, said mechanism being provided with a sprocket-chain, means actuated by the supporting member for preventing undue slack in said sprocket-chain, and an actuating member for moving the discharging device from the contiguous portion of the fertilizer and thereby moving the supporting member and operating said means, substantially as and for the purpose described.

14. In a fertilizer-distributer, the combination of a receptacle for the fertilizer, a discharging device, said device being movable for discharging the fertilizer and being at rest when not discharging the fertilizer, a reciprocating supporting member for the discharging device, power-transmitting mechanism for actuating the discharging device, said mechanism being provided with a sprocket-chain, a support movable with the reciprocating supporting member and provided with means engaged with the sprocket-chain for preventing undue slack of said chain, substantially as and for the purpose specified.

In testimony whereof I have hereunto signed my name, in the presence of two attesting witnesses, at Syracuse, in the county of Onondaga, in the State of New York, this 17th day of June, 1901.

ROBERT LOVE.

Witnesses:
W. C. BRAYTON,
D. LAVINE.